United States Patent [19]

Zwanikken et al.

[11] Patent Number: 5,980,377
[45] Date of Patent: Nov. 9, 1999

[54] METHOD AND DEVICE FOR PROCESSING A SLAUGHTERED ANIMAL OR PART THEREOF IN A SLAUGHTERHOUSE

[75] Inventors: Radboud Hubert Gerard Zwanikken, Boxmeer; Adrianus Josephes van den Nieuwelaar, Gemert, both of Netherlands

[73] Assignee: Stork PMT B.V., Netherlands

[21] Appl. No.: 08/892,643

[22] Filed: Jul. 15, 1997

[30] Foreign Application Priority Data

Jul. 19, 1996 [NL] Netherlands ............... 1003647

[51] Int. Cl.⁶ .................................. A22C 21/00
[52] U.S. Cl. ............................. 452/184; 452/158
[58] Field of Search ................. 452/184, 52, 53, 452/158

[56] References Cited

U.S. PATENT DOCUMENTS

| | | | |
|---|---|---|---|
| 3,622,000 | 11/1971 | McClenny | 452/184 |
| 4,412,620 | 11/1983 | Altenpohl et al. | 452/184 |
| 4,483,047 | 11/1984 | Linville, Jr. | 452/184 |
| 4,601,083 | 7/1986 | Shoji et al. | 452/157 |
| 4,627,007 | 12/1986 | Muschany . | |
| 5,194,036 | 3/1993 | Cheualier et al. | 452/157 |
| 5,205,779 | 4/1993 | O'Brien et al. | 452/157 |
| 5,269,721 | 12/1993 | Meyn | 452/117 |
| 5,470,274 | 11/1995 | Kaoi et al. | 452/184 |
| 5,498,202 | 3/1996 | Berg | 452/184 |
| 5,668,634 | 9/1997 | Newman | 452/157 |

FOREIGN PATENT DOCUMENTS

| | | |
|---|---|---|
| 0 273 371 A2 | 7/1988 | European Pat. Off. . |
| 0 295 349 A2 | 12/1988 | European Pat. Off. . |
| 1 400 334 | 5/1965 | France . |
| 1 578 524 1 | 11/1980 | United Kingdom . |
| WO 94/00997 | 1/1994 | WIPO . |

*Primary Examiner*—Willis Little
*Attorney, Agent, or Firm*—John S. Pratt; Kilpatrick Stockton LLP

[57] ABSTRACT

In a method and device for processing a slaughtered animal or part thereof, which, in a conveyer, is passed along a slaughter line, the following steps are carried out: an identification is assigned to the slaughtered animal or part thereof; one or more observations are performed on the slaughtered animal or part thereof; a test result is determined for the slaughtered animal or part thereof, which test result comprises an approval or rejection, on the basis of the observation data; the test result is stored in conjunction with the corresponding identification. On the basis of the stored test result, the identified slaughtered animal or part thereof can be removed from the slaughter line by an automatic discharging device or a separating device, which each have a first and a second discharge for removing a slaughtered animal or part thereof which has been approved or rejected, respectively.

41 Claims, 5 Drawing Sheets

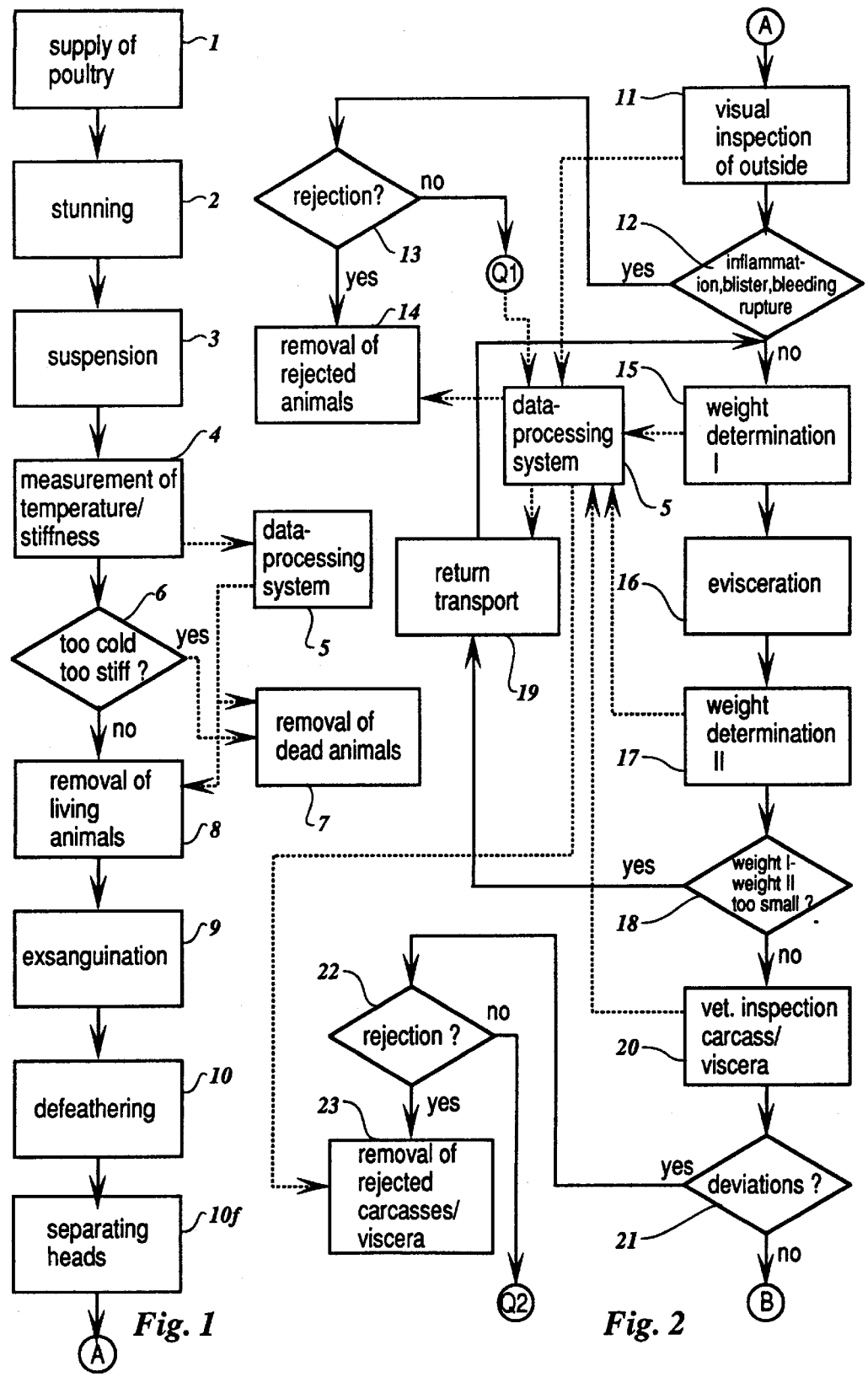

METHOD AND DEVICE FOR PROCESSING A SLAUGHTERED ANIMAL OR PART THEREOF IN A SLAUGHTERHOUSE

BACKGROUND OF THE INVENTION

This invention relates to a method and a device for processing a slaughtered animal or part thereof in a slaughter line of a slaughterhouse. In the following text, a slaughter line is understood to mean an assembly of one or more conveyors and processing stations, in which an animal for slaughtering, such as cattle, small livestock and poultry can be slaughtered. For the sake of simplicity, in the following text a slaughtered animal or part thereof will be referred to by the words "slaughtering object".

DISCUSSION OF THE PRIOR ART

In the context of advancing mechanization and automation of the activities within a slaughterhouse, in the past systems equipped with cameras were introduced to perform a visual inspection of an slaughtering object, in particular in the region of the start of the slaughter line at the time when the hair or feathers are removed from the slaughtering object. In this manner, it was already possible to approve or reject slaughtering objects in the slaughter line on the basis of specific external characteristics without human intervention by automatically analysing the pictures taken using the camera systems and, on the basis of this analysis, taking a decision on approval/rejection. An approval is normally made in various classes.

Owing to statutory regulations, an inspection is still always carried out by a veterinary inspector in an inspection station in the region of the start of the slaughter line. Hitherto, slaughtering objects have been rejected only by humans. Personal inspection forms a major barrier to the further mechanization and automation of slaughtering activities and to increasing the throughput capacity of the slaughter line: humans have a limited observation rate and further their observation capacity is limited. Therefore, if it is desired to increase the speed of the slaughter line while retaining or increasing the inspection quality, it will be necessary as far as possible to replace the human inspector by automatic inspection devices.

As matters stand, a further disadvantage is that the inspector is used to removing from the slaughter line, the slaughtering objects which he has rejected, or separating parts of rejected slaughtering objects, himself. The inspection station forms, as it were, a partial slaughterhouse within the overall slaughterhouse. It will be clear that these ancillary duties of the veterinary inspector also have an undesired negative effect on the throughput capacity of the slaughter line.

SUMMARY OF THE INVENTION

The object of the invention is to provide a method and a device in which the inspection tasks are carried out completely, or almost completely, automatically, and in which in particular the current limitations caused by the inspector are substantially eliminated.

Another object of the invention is to optimize the processing of a slaughtered animal, even if a part thereof is rejected. In the latter case often the remaining part of the slaughtered animal can still be processed.

A further object of the invention is to increase the efficiency and the flexibility of the processing of animals for slaughtering.

To attain the above objects, the method according to the invention comprises the following steps: assigning an identification to the carrier or the slaughtering object associated thereto; performing one or more observations on the slaughtering object; determining a test result for the slaughtering object, which test result comprises an approval or rejection, based on the observation data; storing the test result in conjunction with the corresponding identification; and on the basis of the stored test result, removing the identified slaughtering object from an automatic discharging device, which is disposed in the slaughter line and has at least a first discharge for removing the slaughtering object, if the said object has been approved, and a second discharge for removing the slaughtering object, if the said object has been rejected. Instead of an automatic discharging device, or in addition thereto, the slaughter line may comprise one or more separating devices, in which a portion of the slaughtering object is separated off. The separating device has at least a first discharge for removing the separated portion, if the said portion has been approved, and a second discharge for removing the separated portion, if the said portion has been rejected. A rejection may be temporary or permanent. A temporary rejection of a slaughtered animal or part thereof may be eliminated by repeating the treatment which is at the root of this rejection, optionally in a modified form (examples: eviscerating, cooling), while the permanent rejection of a slaughtered animal or part thereof is, obviously, final (examples: infectious disease, broken wing).

The observation of one or more characteristics of each slaughtering object can be carried out by a human observer, such as a slaughterhouse employee or a veterinary inspector, but can also be carried out by an observation device, which is designed, for example, to carry out a visual observation (colour, shape, surface condition, etc.), or detecting a temperature of the slaughtered animal or part thereof, a stiffness of the slaughtered animal, the bacteriological condition of, for example, the skin, etc. In any case, the three latter observations cannot be performed by a human observer. If the observation can be carried out by a human observer, the latter preferably uses an input station for inputting data to a data-processing system relating to at least one observation on the slaughtering object. The use of such an input station, which may comprise, for example, a touch screen or a keyboard or button panel, for indicating a specific deviation, already represents a considerable advance in the throughput capacity of the slaughter line. An automatic discharging device or a separating device can then be controlled by the data-processing system on the basis of the data input by the input station.

Deviations which can be determined on a carcass of poultry by a veterinary inspector, by an automatic image-processing device or using a blood or tissue sample comprise: blueness/redness of the carcass owing to an infection or poor transport conditions, redness of the carcass owing to insufficient exsanguination thereof, yellow adipose tissue owing to jaundice or because it is a corn-fed chicken, gangrene on the back or breast of the carcass, an excessive scalding treatment, considerable emaciation in relation to the average of the flock, fractures, hydropsis cloaca, contamination with faeces or gall or the stomach contents, synovitis or arthritis, pneumoderma, a breast blister, a fatting spot, insufficient plucking of the carcass, etc. Deviations to the viscera of poultry which can be observed by a veterinary inspector, by means of an automatic image-processing device or using a blood or tissue sample comprise: pericarditis, pericardium, polyserositis, Marek's disease, leucosis, aspergillosis, etc.

In the method according to the invention, at least one observation on a slaughtering object preferably takes place in an inspection station which is disposed in the slaughter line upstream of a discharging device or a separating device. In this way, it is possible, in the discharging device or separating device, for the slaughtering object to be removed, as necessary on the basis of the observation, via the first or the second discharge from the discharging device, or for the portion of the slaughtering object to be removed, as necessary, via the first or second discharge from the separating device. In principle, an observation on a slaughtering object can take place anywhere in the slaughter line.

Both in the observation of the characteristics of each slaughtering animal or part thereof and in the processing of the slaughtered animal or part thereof in a processing station, the identification belonging to the animal for slaughtering or part thereof, or the associated carrier, acts as a key to data which are to be registered or have been registered relating to the slaughtered animal or part thereof. In general, an identification reading system will be used to ascertain the identification at a certain point in the slaughter line for the purpose of the action to be carried out at this point. In the context of the identification, it is possible to assign a unique code to each carrier, such as a hook, but it is also possible, starting from a reference position, simply to count the carriers and thus to establish a one-to-one relationship between carriers (and the associated slaughtered animal or part thereof) and data. It is also possible to assign an identification to the slaughtering object by attaching a suitable mark, such as an incision at a specific location, a metal pin, a coloured flag or marking, or the like, to the said object or to its carrier. A mark of this kind can be applied manually or automatically on the basis of an observation.

The method and device according to the invention in principle make it possible to use the existing separating device(s) already present in the slaughterhouse, after a second discharge has been attached thereto, for separating operations which were previously carried out by the veterinary inspector. The latter's task is thus simplified and, if a sufficient number of sufficiently refined observation devices are provided, can be dispensed with. Depending on the nature of the deviation found on the slaughtered animal, this deviation is therefore corrected under the control of a data-processing system in the machine which is in any case necessarily present in the slaughter line for treating an approved slaughtering object and which is most suitable for carrying out the necessary corrective treatment.

In a preferred embodiment of the method according to the invention, the observation consists in taking one or more blood or tissue samples from the slaughtering object and examining the samples with regard to, for example, pH or the number of specific bacteria present.

In a following preferred embodiment of the method according to the invention, the observation consists in determining, at the start of the slaughter line, the temperature and/or the stiffness of the animal for slaughtering and/or corneal reflex and/or a scan of the brain activity, so that it can be established whether the animal for slaughtering was still alive or was already dead on arrival at the slaughterhouse. If the latter is the case, the relevant animal for slaughtering is removed from the slaughter line via the second discharge from a discharging station.

In another preferred embodiment, after dehairing or defeathering the slaughtered animal, at least a portion of the body of the slaughtered animal is inspected in the slaughter line to establish the presence of, inter alia, inflammations, blisters, bleeding and/or ruptures. The presence of one or more of the said deviations may be a reason to remove the slaughtered animal from the slaughter line in the next discharging station or, if the deviation is limited to a specific part of the body, such as a wing, a breast fillet or a leg, may lead to removal of the relevant part of the body via the second discharge from a separating station for the relevant part of the body.

In another preferred embodiment of the method according to the invention, after the viscera have been removed from the body of the slaughtered animal, at least a portion of the viscera is visually inspected in the slaughter line, in particular by at least one video camera, to determine deviations. The deviations detected may form a basis for removing the viscera from the slaughter line via a second discharge of a downstream discharging station or may lead to the removal of an organ identified on the basis of the inspection via a second discharge of a downstream separating station.

In the following preferred embodiment, at least one observation is performed on the slaughtering object before it undergoes a processing in a processing device and after it has undergone the processing in the processing device. An example of this observation is the determination of the weight of the slaughtered animal before and after it has been eviscerated, it being possible to establish, on the basis of the (excessive) weight of the slaughtered animal after evisceration, that not all the organs have been removed. The slaughtered animal can then be taken out of the slaughter line via the second discharge of a downstream discharging device and can be returned to the slaughter line at a point situated upstream of the evisceration device and the weight determinations, in order to repeat the evisceration.

In a further preferred embodiment of a device according to the invention, which comprises at least one observation device and at least one automatic discharging device, the second discharge of the discharging device is connected to a conveyor for passing a slaughtering object past an observer. This embodiment provides for the circumstance where it is not possible to establish with sufficient accuracy and/or reliability by means of the observation device whether a deviation is present, while the risk of the deviation not being present is insufficiently low. The slaughtering object can then still be guided past a human observer who can make a definitive judgement on the slaughtering object. After passing the human observer, and depending on the test result determined by the said observer, the slaughtering object can be returned to the slaughter line or removed therefrom.

In a further method and device according to the invention for processing slaughtering objects, such as slaughtered animals or parts thereof, which, in a conveyor are passed along a slaughterline of a slaughterhouse, the following steps are performed: performing at least one processing on one or more slaughtering objects in a processing device; performing one or more observations on said one or more slaughtering objects; determining a test result for said one or more slaughtering objects, which test result comprises an approval or rejection, based on the observation data; wherein if the test result for said one or more slaughtering objects is a rejection, a setting of the processing device is automatically changed, such that the rate of rejections is reduced. In this way the processing in the processing device is controlled such that for a sequence of slaughtering objects an optimum processing result is obtained. If the processing in the processing device comprising a cooling in a cooling device, the observation preferably comprises determining the temperature of one or more slaughtering objects, the cooling being increased if the temperature of said one or more slaughtering objects is above a predetermined temperature range, while the cooling is decreased if the temperature of the one or more slaughtering objects is below said temperature range. If the processing in the processing device comprises scalding in a scalding device, and dehairing in a dehairing device or defeathering in a defeathering device, the observation preferably comprises an inspection on residual hairs or feathers, respectively, on the one or more slaughtering objects, increasing the scalding temperature in the scalding device and/or the intensity of the dehairing or defeathering, respectively, if a predetermined limit amount of residual hairs or feathers, respectively, is exceeded for said one or more slaughtering objects. The results of still other processings, such as a separating operation in a separating device may also be inspected, the setting of the separating device being automatically changed to optimize the separation results for a sequence of slaughtering objects if too many rejections are observed.

Preferably, in an advantageous method and device for processing carcasses and clusters of viscera of slaughtered animals, which carcasses and clusters of viscera each are passed along a slaughter line of a slaughterhouse in a conveyor with carriers for the carcasses and carriers for the clusters of viscera, respectively, the following steps are performed: assigning an identification to each carrier or the associated carcass or cluster of viscera, respectively; performing one or more automatic observations on each carcass and cluster of viscera, respectively; determining a test result for each carcass and cluster of viscera, respectively, which test result comprises a conditional or unconditional approval or a rejection, based on the observation data; storing the test result in conjunction with the corresponding identification; on the basis of the test results, routing the identified carcasses to an inspection station with a veterinary inspector, if the carcasses are conditionally approved, and by-passing the inspection station if the carcasses are unconditionally approved or rejected; and on the basis of the test results, routing the identified clusters of viscera to the inspection station if the clusters of viscera are conditionally or unconditionally approved. In the method and device described above, the handling of the carcasses and the clusters of viscera may also be changed in that, on the basis of the test results, the identified clusters of viscera are routed to an inspection station with a veterinary inspector, if the clusters of viscera are conditionally approved, and the inspection station is by-passed if the clusters or viscera are unconditionally approved or rejected, and, on the basis of the test results, the identified carcasses are routed to the inspection station if the carcasses are conditionally or unconditionally approved. In the inspection station, the veterinary inspector only needs to inspect a cluster of viscera for which the corresponding carcass is present or, alternatively, a carcass for which the corresponding cluster or viscera is present. This will relieve the inspection burden of the veterinary inspector substantially, allowing a higher processing speed in the slaughter line.

The data-processing system of the device according to the invention preferably comprises a neural network which can ensure a reliable determination of a test result under the changing conditions in the slaughter line.

The claims and advantages will be more readily appreciated as the same becomes better understood by reference to the following description of preferred embodiments of the invention when read in conjuction with the annexed Figures, in which identical reference symbols relate to identical parts of the processing or identical devices.

BRIEF DESCRIPTION OF THE DRAWINGS

FIG. 1 diagrammatically illustrates a first part of the processing of a slaughtered animal in the form of poultry according to the invention, in the form of a flow diagram;

FIG. 2 diagrammatically illustrates a second part of the processing of poultry according to the invention, in the form of a flow diagram;

DESCRIPTION OF THE PREFERRED EMBODIMENTS

In the figures, arrows which consist of dashed lines relate to the supply of observation data to a data-processing system or the supply of control data from the data-processing system to a discharging device or a separating device, depending on the direction of the arrow.

Figure 1A:
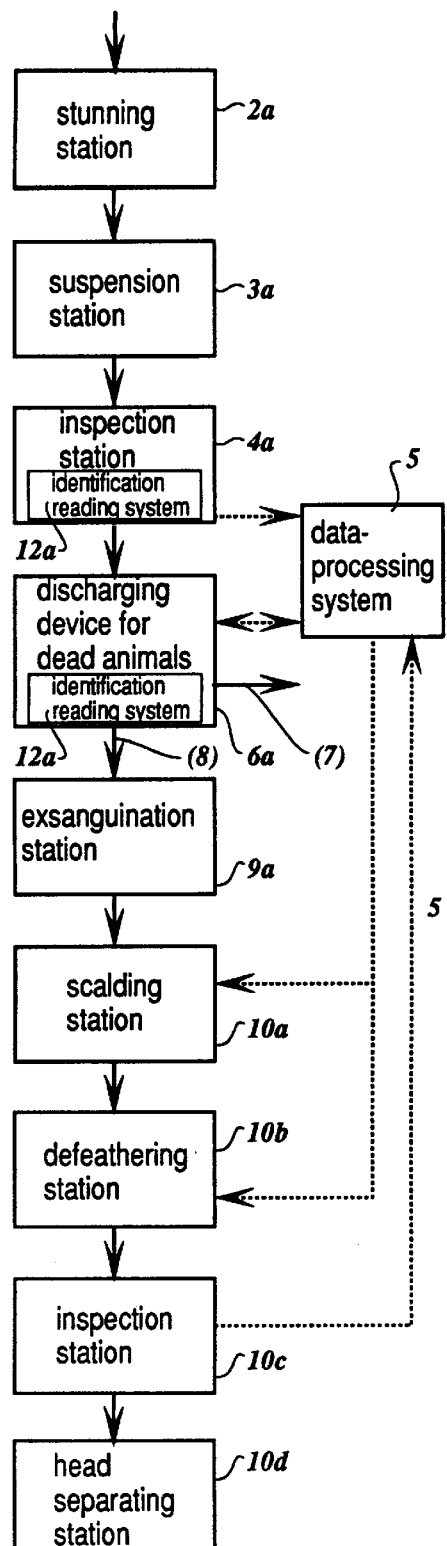
FIG. 1a diagrammatically shows the devices associated with the processing steps depicted in FIG. 1.

In accordance with FIGS. 1 and 1a, the processing of poultry in a slaugherhouse begins with the arrival of the animals for slaughtering, as indicated in step 1. In a following step 2, at the start of a slaughter line, the poultry is stunned electrically or stunned by means of a specific gas or gas mixture in a stunning station 2a. Then, in step 3, the animals for slaughtering are suspended in a suspending station 3a in a conveyor (not shown in more detail), such as a known endless conveyor using hooks for suspending the animals for slaughtering by their legs, after which, during transportation, in a step 4 the temperature (by means of an infrased sensor) and/or stiffness (by mechanical means) of each stunned animal for slaughtering is measured in an inspection station 4a. Data relating to the measurement in step 4 and the identification of each fowl are sent to a data-processing system 5, which carries out the evaluation shown in diamond 6 "is the animal for slaughtering too cold and/or too stiff to have been alive at the start of step 2?", on the basis of which it establishes the following test result: animals which are deemed to have already been dead prior to step 2 are removed via a second discharge of a discharging device 6a under the control of the data-processing system 5, on the basis of the corresponding identification, as indicated in step 7, while the remaining animals remain in the slaughter line and are removed via a first discharge of the discharging device 6a, as shown in step 8. The discharging device may comprise a known transferring device for transferring slaughtering objects from one conveyor to another. It is to be noted that the evaluation shown in diamond 6 may alternatively be carried out before the step 2 of stunning the birds, placing the inspection station 4aand the discharging device 6a upstream of the stunning station 2a.

Then, in step 9, the carotid artery of the animals for slaughtering is severed in an exsanguination station 9a, so that they bleed to death. In a following step 10, the dead animals are scalded in a scalding station 10a and are plucked in a plucking station 10b known per se.

As illustrated in FIG. 1a, after the defeathering operation in the defeathering station 10b, in an inspection station 10c the residual amount of feathers on the body of the birds is determined by visual inspection, e.g. with a video camera and appropriate processing of the visual information in the data-processing system 5. If the residual amount of feathers exceeds a predetermined amount for one or more birds in a sequence of birds, then obviously the scalding station 10a and/or the defeathering station 10b are not functioning properly. Under these circumstances, the data-processing system 5 commands the scalding station 10a to increase the scalding temperature if it is not already at its limit value. Instead of this action, or in addition thereto, the data-processing system 5 may command the defeathering station 10b to increase the intensity of the defeathering, e.g. by changing the position or the speed of the pluck fingers thereof.

Further, it is to be noted that the animals which are deemed to have been dead already prior to step 2 are removed from the slaughter line directly after passing the inspection station 4a. Said animals may also, like the rest of the animals, be defeathered first before being removed from the slaughter line, since defeathered birds can be destroyed easier than birds still having their feathers.

In a following step 10f, the heads of the slaughtered animals are separated from their bodies in a head separating station 10d.

Figure 2A:
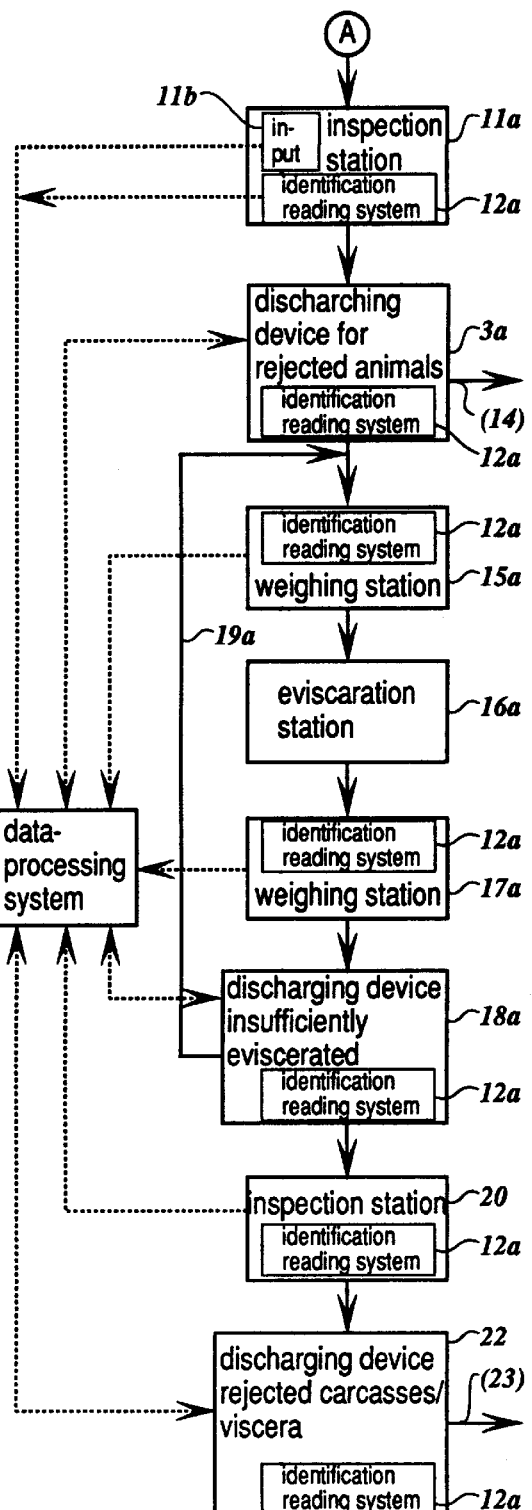
FIG. 2a diagrammatically shows the devices associated with the processing steps depicted in FIG. 2.

The processing after the encircled letter A in FIGS. 2 and 2a follows the processing prior to the encircled letter A in FIGS. 1 and 1a. In FIGS. 2 and 2a, in a step 11, the outside of the slaughtered animal is inspected in an inspection station 11a, for example by an inspector, or by an observation device which comprises one or more video cameras. In the case of an inspector, data relating to the inspection are supplied to the data-processing system 5 via an input station 11b, in conjunction with the identification, read by an identification reading system 12a, of the relevant slaughtered animal, which system evaluates the data in order to reach a reply to the question indicated in diamond 12: "are any inflammations, blisters, bleeding or ruptures to be observed on the outside of the slaughtered animal?". If the answer to the question is "yes", the more detailed evaluation indicated in diamond 13 is carried out: "are the blisters, bleeding or ruptures detected reason to reject the slaughtered animal all together?". If the answer to this question is "yes", the slaughtered animal is removed from the slaughter line via a second discharge from a discharging device 13a under the control of the data-processing system 5, on the basis of the corresponding identification, as indicated by step 14. If, on the basis of the visual inspection, the rejection applies only to a specific part of the animal for slaughtering, the relevant part is later separated off in the slaughter line by a suitable separating device known per se and removed via a second discharge of the said separating device. For the purpose of the description given here, it is assumed that the rejected part is a wing, this deviation being stored in the data-processing system 5 in conjunction with the identification of the slaughtered animal. This matter will be returned to in the context of the description of FIG. 3.

The slaughtered animals on which no inflammations, blisters, bleeding or ruptures have been detected are weighed in a step 15 in a weighing station 15a known per se, the weighing data being supplied to the data-processing system 5 with the identification of the slaughtered animal. In a following step 16, the viscera are removed from the slaughtered animal in an envisceration station 16a, after which, in a step 17, the enviscerated slaughtered animal is again weighed in a weighing station 17a, the weighing data again being supplied to the data-processing system 5 with the identification of the slaughtered animal. As indicated in diamond 18, the data-processing system 5 then evaluates the question: "is the difference between the weight determined in step 15 and the weight determined in step 17 too small (in other words: have the viscera been incompletely removed) ?". If the answer to this question is "yes", the data-processing system controls a discharging device 18a such that the partially eviscerated slaughtered animal is removed from the slaughter line via a second discharge of the discharging device, on the basis of the corresponding identification, and is returned by a conveyor 19a to a point prior to step 15, as illustrated by step 19.

If the result of the evaluation under 18 indicates that all the viscera have been removed, in a step 20 a veterinary inspection of a carcass and the associated viscera takes place in an inspection station 20a. The inspection can be carried out by a human observer or by an observation device, which comprises, for example, one or more video cameras. Data relating to the observation are supplied to the data-processing system 5 in conjunction with the identification of the relevant slaughtering object. The data-processing system 5 then evaluates the question indicated in diamond 21: "does the carcass and/or the viscera contain a deviation?". If the answer to this question is "yes", it is investigated in a subsequent evaluation, indicated at diamond 22, whether the rejection is absolute. If this is the case, the data-processing system 5 controls a discharging device 22a incorporated in the slaughter line such that a rejected carcass and/or rejected viscera are removed from the slaughter line via the second discharge of the discharging device, on the basis of the corresponding identification, as indicated in step 23. If only a specific portion of the carcass and/or the viscera is rejected, data relating to the deviation and the identification belonging to the relevant slaughtering object are stored in the data-processing system and the rejected portion is separated in a separating device situated downstream in the slaughter line and removed from the slaughter line via a second discharge of the separating device. For the purpose of this description, it is assumed that, of the viscera, the liver has been rejected. This matter will be returned to in the context of the discussion of FIGS. 4 and 4a.

Figures 3, 4:
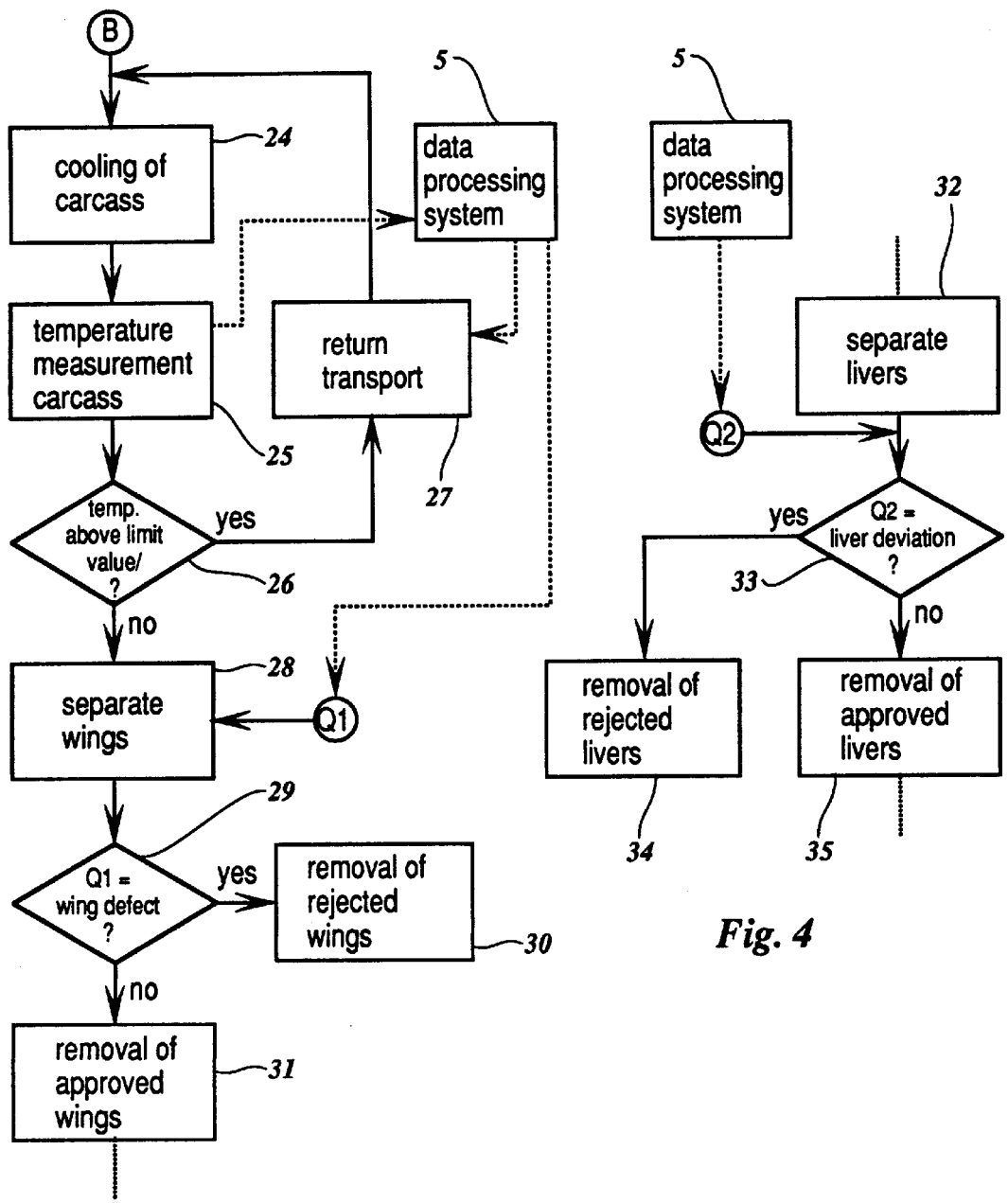
FIG. 3 diagrammatically illustrates a third part of the processing of poultry according to the invention, in the form of a flow diagram.
FIG. 4 diagrammatically illustrates a fourth part of the processing of poultry according to the invention, in the form of a flow diagram.
Figure 3A:
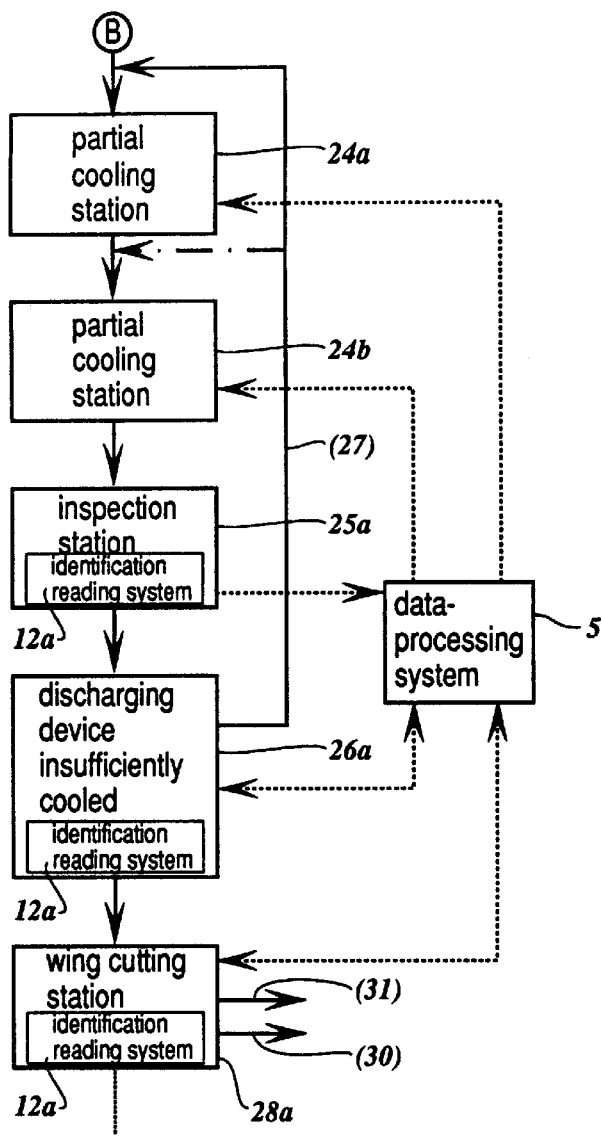
FIG. 3a diagrammatically shows the devices associated with the processing steps depicted in FIG. 3.
Figure 4A:
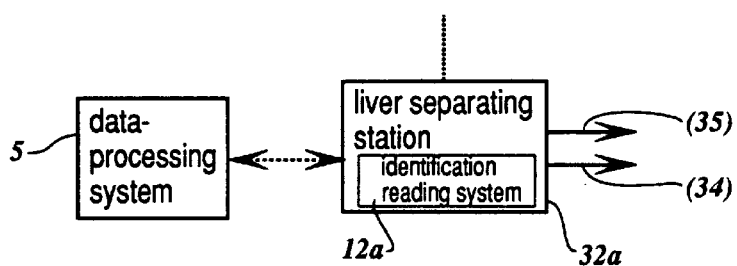
FIG. 4a diagrammatically shows the device associated with the processing steps depicted in FIG. 4.

In the processings described in FIGS. 3 and 3a, the encircled letter B follows that part of the processing discussed in FIGS. 2 and 2a. In FIGS. 3 and 3a, in a step 24, the poultry carcass from which the viscera have been removed is cooled for a predetermined time and under predetermined conditions in a known partial cooling station 24a and a known partial cooling station 24b. After the cooling process, in a step 25, the temperature of the carcass is measured in an inspection station 25a, e.g. by an infrared sensor, the temperature measurement data in conjunction with the identification of the relevant slaughtering object being supplied to the data-processing system 5. As indicated in diamond 26, the data-processing system 5 then evaluates whether the temperature of the carcass is above a specific limit value. If this is the case, the data-processing system 5 controls a discharging device 26a incorporated in the slaughter line such that the carcass is returned, on the basis of the corresponding identification, via a second discharge of the discharging device 26a to a point in the cooling process and arrives at a point in the slaughter line upstream of the step 24. This is indicated on the basis of step 27. Obviously, it is also possible to have the carcass repeat only part of the cooling process, as indicated in FIG. 3a by a dot-dashed line.

The temperature of the carcass measured in the inspection station 25a may also be used to change the cooling in one or both of the partial cooling stations 24a, 24b. If the temperature of one or more carcasses from a sequence of carcasses coming out of the partial cooling stations 24a, 24b appears to be above a predetermined temperature range, then the data-processing system 5 may command the cooling in the cooling stations to increase. on the other hand, if the temperature of the carcasses appears to be below said predetermined temperature range, then the data-processing system 5 may command the cooling in the cooling stations to decrease.

If the carcass has been sufficiently cooled in step 24, in a step 28 a wing-cutting operation is carried out in a wing-cutting station 28a known per se. In this operation, as indicated by the encircled designation Q1, use is made of a test result which is determined in the evaluation in accordance with diamond 13. As indicated in diamond 29, the data-processing system 5 investigates, on the basis of the corresponding identification, whether a carcass has a previously detected wing defect. If so, the defective wing is removed via a second dischage of the wing-cutting device, as indicated at step 30. Normal wings are removed via the first discharge of the wing-cutting device, as indicated by step 31.

FIG. 4 shows a further part of the treatments carried out in a slaughter line, where livers are separated from the viscera connected thereto in a liver-separating station 32a known per se in accordance with step 32. In this case, the removal of the livers from the liver-separating station 32a is controlled by the data-processing system 5 on the basis of data stored in the system after carrying out the evaluation indicated in diamond 22 of FIG. 2. As indicated by the encircled designation Q2, it is determined in the data-processing system 5, in accordance with diamond 33, whether specific viscera, on the basis of the corresponding identification, have a rejected liver. If so, the liver is removed via the second discharge of the liver-separating station 32a, as indicated in step 34. Normal livers are removed via a first discharge of the liver-separating station 32a, in a step 35.

Figure 5A:
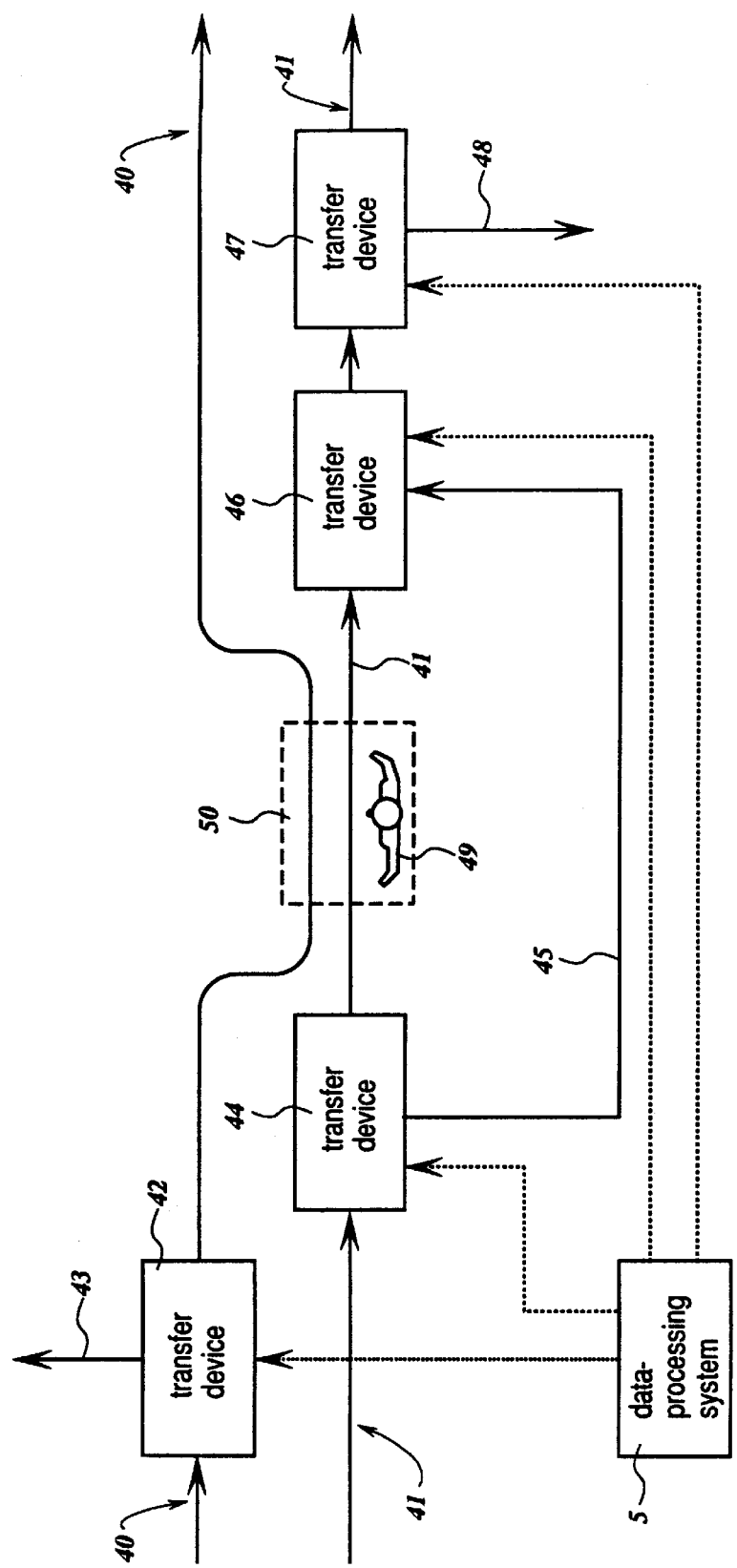
FIG. 5a diagrammatically shows a top view of a part of a slaughter line in which carcasses and clusters of viscera are inspected by a veterinary inspector.

FIG. 5a shows a part of a slaughter line, including a viscera conveyor 40 and a carcass conveyor 41. In the viscera conveyor 40, a transfer device 42 is situated, transferring clusters of viscera which have been rejected to a conveyor 43. As a result, downstream of the transfer device 42 only conditionally and unconditionally approved clusters of viscera are conveyed in the viscera conveyor 40. In the carcass conveyor 41, a transfer device 44 is situated, in which rejected or unconditionally approved carcasses are transferred from the carcass conveyor 41 to a by-pass conveyor 45, such that downstream of the transfer device 44 only conditionally approved carcasses are conveyed in the carcass conveyor 41. A further transfer device 46 situated in the carcass conveyor 41 transfers the rejected and unconditionally approved carcasses back into the carcass conveyor 41. Downstream of the transfer device 46 another transfer device 47 is situated in the carcass conveyor 41 for transferring the rejected carcasses from the carcass conveyor 41 to a conveyor 48. As a result, a veterinary inspector 49 in an inspection station indicated at 50 with dashed lines, only needs to inspect conditionally approved clusters of viscera and conditionally approved carcasses in so far as these are associated with each other. The inspector 49 need not pay any attention to clusters of viscera for which no corresponding carcass is present in the carcass conveyor 41. With the described arrangement, the inspection task of the inspector 49 is greatly reduced.

In FIG. 5a upstream of the transfer devices 42 and 44 the clusters of viscera and carcasses, respectively, or the carriers thereof have been assigned an identification, after which the clusters of viscera and carcasses have been observed in an observation device for determining a test result, which comprises a conditional or unconditional approval or a rejection, based on the observation data. Each test result has been stored in conjunction with the corresponding identification in the data-processing system 5, which controls the transfer devices 43, 44, 46 and 47 accordingly.

Referring again to FIG. 5a, it is also possible to use the conveyor 40 as a carcass conveyor, and to use the conveyor 41 as a viscera conveyor. In such an arrangement, the transfer device 42 will transfer rejected carcasses to the conveyor 43, the transfer device 44 will transfer rejected and unconditionally approved clusters of viscera from the viscera conveyor 41 to the by-pass conveyor 45, the transfer device 46 will transfer rejected and unconditionally approved clusters of viscera from the by-pass conveyor 45 to the viscera conveyor 41, and the transfer device 47 will transfer rejected clusters of viscera from the viscera conveyor 41 to the conveyor 48. As a result, in the inspection station 50 only conditionally approved clusters of viscera, and conditionally and unconditionally approved carcasses will pass. The veterinary inspector 49 needs only inspect the carcasses for which the corresponding cluster of viscera is present, and may disregard the remaining carcasses.

In the drawings and specification, there have been set forth preferred embodiments of the invention, and although specific terms are employed, they are used in a generic and descriptive sense only and not for purposes of limitation.

What is claimed is:

1. A method for processing a slaughtering object, such as a slaughtered animal or part thereof, which, in a conveyor with a carrier for the slaughtering object, is passed along a slaughter line of a slaughterhouse, the method comprising the following steps:

assigning an identification to the carrier or the associated slaughtering object;

performing one or more observations on the slaughtering object;

determining a test result for the slaughtering object, which test result comprises an approval or rejection, based on the observation data;

storing the test result in conjunction with the corresponding identification; and on the basis of the stored test result, removing the identified slaughtering object from an automatic discharging device, which is disposed in the slaughter line and has at least a first discharge for removing the slaughtering object, if the said object has been approved, and a second discharge for removing the slaughtering object, if the said object has been rejected, wherein the slaughtering object removed via the second discharge is returned to an upstream point in the slaughter line, where it is reintroduced into the slaughter line.

2. The method of claim 1, wherein at least one observation takes place in an inspection station which is disposed in the slaughter line upstream of the discharging device.

3. A method for processing a slaughtering object, such as a slaughtered animal or part thereof, which, in a conveyor with a carrier for the slaughtering object, is passed along a slaughter line of a slaughterhouse, the method comprising the following steps:

assigning an identification to the carrier or the associated slaughtering object;

performing one or more observations on the slaughtering object;

determining a test result for the slaughtering object, which test result comprises an approval or rejection, based on the observation data;

storing the test result in conjunction with the corresponding identification; and on the basis of the stored test result, removing the identified slaughtering object from a separating device, which is disposed in the slaughter line and has at least a first discharge for removing a portion of the slaughtering object which is to be separated off in the separating device, if the said port ion has been approved, and a second discharge for removing the portion of the slaughtering object which is to be separated off in the separating device, if the said port ion has been rejected.

4. The method of claim 3, wherein one observation takes place in an inspection station which is disposed in the slaughter line upstream of the separating device.

5. The method of claim 3, wherein one or more observations are performed at the start of the slaughter line to determine the occurrence of animals being dead-on-arrival.

6. The method of claim 3, wherein the observation consists in taking one or more blood or tissue samples from the slaughtering object and examining the samples.

7. The method of claim 3, wherein at least a portion of the body of the slaughtered animal is visually inspected in the slaughter line to determine the presence of at least one deviation.

8. The method of claim 7, wherein the visual inspection is carried out by at least one video camera.

9. The method of claim 3, wherein after the viscera have been removed from the body of the slaughtered animal, at least a portion of the viscera is visually inspected in the slaughter line to determine any deviations.

10. The method of claim 9, wherein the visual inspection is carried out by at least one video camera.

11. The method of claim 3, wherein at least one observation is performed on the s laughtering object before it undergoes a processing in a processing device and after it has undergone the processing in the processing device, on the basis of which observations the test result is determined.

12. The method of claim 11, wherein the observation consists in determining the weight of the slaughtering object.

13. The method of claim 3, wherein the slaughtering object removed via the second discharge is returned to an upstream point in the slaughter line, where it is reintroduced into the slaughter line.

14. A method for processing slaughtering objects, such as slaughtered animals or parts thereof, which in a conveyor are passed along a slaughter line of a slaughter house, the method comprising the following steps:

performing at least one processing on one or more slaughtering objects in a processing device;

performing one or more observations on said one or more slaughtering objects;

determining a test result for said one or more slaughtering objects, which test result comprises an approval or rejection, based on the observation data;

wherein if the test result for said one or more slaughtering objects is a rejection, a setting of the processing device is automatically changed, such that the rate of rejections is reduced.

15. The method of claim 14, wherein the processing in the processing device comprises a cooling in a cooling device, the observation comprises determining the temperature of the one or more slaughtering objects, the test result is a rejection if the temperature is outside a predetermined temperature range, and the cooling is increased if the temperature of said one or more slaughtering objects is above said temperature range, while the cooling is decreased if the temperature of said one or more slaughtering objects is below said temperature range.

16. The method of claim 14, wherein the processing in the processing device comprises scalding in a scalding device, and dehairing in a dehairing device or defeathering in a defeathering device, the observation comprises an inspection on residual hairs or feathers, respectively, on the one or more slaughtering objects, the test result is a rejection if the amount of residual hairs or feathers, respectively, exceeds a predetermined limit amount, and that the scalding temperature in the scalding device and/or the intensity of the dehairing or defeathering, respectively, is increased if said limit amount of residual hairs or feathers, respectively, is exceeded for said one or more slaughtering objects.

17. A method for processing carcasses and clusters of viscera of slaughtered animals, which carcasses and clusters of viscera each are passed along a slaughter line of a slaughterhouse in a conveyor with carriers for the carcasses and carriers for the clusters of viscera, respectively, the method comprising the following steps:

assigning an identification to each carrier or the associated carcass or cluster of viscera, respectively;

performing one or more automatic observations on each carcass and cluster of viscera, respectively;

determining a test result for each carcass and cluster of viscera, respectively, which test result comprises a conditional or unconditional approval or a rejection, based on the observation data;

storing the test result in conjuction with the corresponding identification;

on the basis of the test results, routing the identified carcasses to an inspection station with a veterinary inspector, if the carcasses are conditionally approved, and by-passing the inspection station if the carcasses are unconditionally approved or rejected; and on the basis of the test results, routing the identified clusters of viscera to the inspection station if the clusters of viscera are conditionally or unconditionally approved.

18. A method for processing carcasses and clusters of viscera of slaughtered animals, which carcasses and clusters of viscera each are passed along a slaughter line of a slaughterhouse in a conveyor with carriers for the carcasses and carriers for the clusters of viscera, respectively, the method comprising the following steps:

assigning an identification to each carrier or the associated carcass or cluster of viscera, respectively;

performing one or more automatic observations on each carcass and cluster of viscera, respectively;

determining a test result for each carcass and cluster of viscera, respectively, which test result comprises a conditional or unconditional approval or a rejection, based on the observation data;

storing the test result in conjuction with the corresponding identification;

on the basis of the test results, routing the identified clusters of viscera to an inspection station with a veterinary inspector, if the clusters of viscera are conditionally approved, and by-passing the inspection station if the clusters of viscera are unconditionally approved or rejected; and on the basis of the test results, routing the identified carcasses to the inspection station if the carcasses are conditionally or unconditionally approved.

19. A device for processing a slaughtering object, such as a slaughtered animal or part thereof, in a slaughter line of a slaughterhouse, the device comprising:

at least one conveyor with carriers, each for the purpose of carrying the slaughtering object, an identification being assigned to each carrier or associated slaughtering object;

at least one observer positioned along the slaughter line for the purpose of performing one or more observations on the slaughtering object;

an input station for the observer to input data relating to at least one observation on the slaughtering object;

a data-processing system for processing the data input by means of the input station, in order to determine a test result for the slaughtering object, which test result comprises an approval or rejection, and for storing the test result in conjunction with the corresponding identification;

at least one automatic discharging device, which is disposed downstream of the observer along the slaughter line and has at least a first discharge for removing the slaughtering object, if the said object has been approved, and has a second discharge for removing the slaughtering object, if the said object has been rejected;

an identification reading system, which interacts with the discharging device, for reading out the identification belonging to the slaughtering object supplied to the discharging device or the associated carrier;

the choice of the first or the second discharge of the discharging device by the data-processing system being controlled on the basis of the test result stored therein and belonging to the identification read out by the identification reading system.

20. A device for processing a slaughtering object, such as a slaughtered animal or part thereof, in a slaughter line of a slaughterhouse, the device comprising:

at least one conveyor with carriers, each for the purpose of carrying the slaughtering object, an identification being assigned to each carrier or associated slaughtering object;

at least one observer positioned along the slaughter line for the purpose of performing one or more observations on the slaughtering object;

an input station for the observer to input data relating to at least one observation on the slaughtering object;

a data-processing system for processing the data input by means of the input station, in order to determine a test result for the slaughtering object, which test result comprises an approval or rejection, and for storing the test result in conjunction with the corresponding identification;

at least one separating device, which is disposed downstream of the observer along the slaughter line and has at least a first discharge for removing a portion, which is to be separated off in the separating device, of the slaughtering object, if the said portion has been approved, and a second discharge for removing a portion, which is to be separated off in the separating device, of the slaughtering object, if the said portion has been rejected;

an identification reading system, which interacts with the separating device, for reading out the identification belonging to the slaughtering object supplied to the separating device or the associated carrier;

the choice of the first or the second discharge of the separating device by the data-processing system being controlled on the basis of the test result stored therein and belonging to the identification read out by the identification reading system.

21. A device for processing a slaughtering object, such as a slaughtered animal or part thereof, in a slaughter line of a slaughterhouse, the device comprising:

at least one conveyor with carriers, each for the purpose of carrying the slaughtering object, an identification being assigned to each carrier or associated slaughtering object;

at least one observation device disposed along the slaughter line for the purpose of performing one or more observations on the slaughtering object;

an identification reading system, which interacts with the observation device, for reading out the identification belonging to the observed slaughtering object or the associated carrier;

a data-processing system for processing data obtained by means of the observation device and relating to at least one observation on the slaughtering object, in order to determine a test result for the slaughtering object, which test result comprises an approval or rejection, and for storing the test result in conjunction with the identification read out by means of the identification reading system;

at least one automatic discharging device, which is disposed downstream of the observation device along the slaughter line and has at least a first discharge for removing the slaughtering object, if the said object has been approved, and a second discharge for removing the slaughtering object, if the said object has been rejected;

an identification reading system, which interacts with the discharging device, for reading out the identification belonging to the slaughtering object supplied to the discharging device or the associated carrier;

the choice of the first or the second discharge from the discharging device by the data-processing system being controlled on the basis of the test result stored therein and belonging to the identification read out by the identification reading system.

22. The device of claim 21, wherein the second discharge is connected to a conveyor for passing a slaughtering object past an observer.

23. A device for processing a slaughtering object, such as a slaughtered animal or part thereof, in a slaughter line of a slaughterhouse, the device comprising:

at least one conveyor with carriers, each for the purpose of carrying the slaughtering object, an identification being assigned to each carrier or associated slaughtering object;

at least one observation device disposed along the slaughter line for the purpose of performing one or more observations on the slaughtering object;

an identification reading system, which interacts with the observation device, for reading out the identification belonging to the observed slaughtering object or the associated carrier;

a data-processing system for processing data obtained by means of the observation device and relating to at least one observation on the slaughtering object, in order to determine a test result for the slaughtering object, which test result comprises an approval or rejection, and for storing the test result in conjunction with the identification read out by means of the identification reading system;

at least one separating device, which is disposed downstream of the observation device along the slaughter line and has at least a first discharge for removing a portion, which is to be separated off in the separating device, of the slaughtering object, if the said portion has been approved, and a second discharge for removing a portion, which is to be separated off in the separating device, of the slaughtering object, if the said portion has been rejected;

an identification reading system, which interacts with the separating device, for reading out the identification belonging to the slaughtering object supplied to the separating device or the associated carrier;

the choice of the first or the second discharge of the separating device by the data-processing system being controlled on the basis of the test result stored therein and belonging to the identification read out by the identification reading system.

24. The device of claim 19, 21, 20 or 23, wherein at least one observation device is provided for carrying out a visual inspection of at least a portion of the slaughtering object after it has been dehaired or defeathered.

25. The device of claim 24, wherein the observation device comprises a video camera.

26. The device of claim 19, 20, 21 or 23, wherein at least one detection device is provided for carrying out a visual inspection of the viscera of the slaughtered animal after they have been removed from the body of the slaughtered animal.

27. The device of claim 26, wherein the observation device comprises a video camera.

28. The device of claim 20 or 23, wherein an observation device is disposed both upstream and downstream of a processing device.

29. The device of claim 28, wherein the observation to be performed in the observation devices consists in determining the weight of the slaughtering object.

30. The device of claim 19, 20, 21 or 23, wherein the second discharge is connected to a conveyor for returning a temporarily rejected slaughtering object to an upstream point in the slaughter line, where the slaughtering object is reintroduced into the slaughter line.

31. A device for processing slaughtered objects, such as slaughtered animals or parts thereof, in a slaughter line of a slaughterhouse, the device comprising:

at least one conveyor for conveying one or more slaughtered objects along the slaughter line;

at least one processing device disposed along the slaughterline for performing a processing on said one or more slaughtering objects;

at least one observation device disposed along the slaughter line for performing one or more observations on said one or more slaughtering objects;

a data-processing system for processing data obtained by means of said at least one observation device and relating to at least one observation on said one or more slaughtering objects in order to determine a test result for said one or more slaughtering objects, which test result comprises an approval or rejection, wherein, if the test result for said one or more slaughtering objects is a rejection, the data-processing system controls a setting of said one or more processing devices such that the rate of rejections is reduced.

32. The device of claim 31, wherein the processing device is a cooling device for cooling said one or more slaughtered objects, the observation device is a temperature measuring device for measuring the temperature of said one or more slaughtering objects, the data-processing system is adapted for comparing the measured temperature to a predetermined temperature range and determining a rejection if the measured temperature is outside the predetermined temperature range, and the data-processing system is adapted for increasing the cooling of the cooling device if the measured temperature of said one or more slaughtering objects is above said temperature range, while the data-processing system is adapted for decreasing the cooling of the cooling device if the measured temperature of said one or more slaughering objects is below said temperature range.

33. The device of claim 31, wherein the processing device comprises a scalding device, and a dehairing or defeathering device for scalding, dehairing or defeathering, respectively, said one or more slaughtering objects, the observation device is an inspection device for determining the amount of residual hairs or feathers, respectively, on the one or more slaughtering objects, the data-processing system is adapted for comparing the determined amount of residual hairs or feathers, respectively, to a predetermined limit amount, and determining a rejection if the determined amount exceeds the limit amount, and the data-processing system is adapted for increasing the scalding temperature in the scalding device and/or the intensity of the dehairing or defeathering in the dehairing or defeathering device, respectively, if said limit amount of residual hairs or feathers, respectively, is exceeded for said one or more slaughtering objects.

34. A device for processing carcasses and clusters of viscera of slaughtered animals, in a slaughter line of a slaughter house, the device comprising:

a first conveyor with carriers, each for the purpose of carrying one of the carcasses, an identification being assigned to each carrier or associated carcass;

a second conveyor with carriers, each for the purpose of carrying one of the clusters of viscera, an identification being assigned to each carrier or associated cluster of viscera;

at least one observation device disposed along the slaughter line for the purpose of performing one or more observations on each carcass and cluster of viscera, respectively;

an identification reading system, which interacts with the at least one observation device, for reading out the identification belonging to the observed carcasses and clusters of viscera, respectively, or the associated carriers;

a data-processing system for processing data obtained by means of the at least one observation device and relating to at least one observation on each carcass and cluster of viscera, respectively, in order to determine a test result for the carcass and cluster of viscera, respectively, which test result comprises a conditional or unconditional approval or a rejection, and for storing the test result in conjuction with the identification read out by means of the identification reading system;

a first routing device for routing, on the basis of the test results, the identified carcasses to an inspection station with a veterinary inspector, if the carcasses are conditionally approved, and by-passing the inspection station if the carcasses are unconditionally approved or rejected; and a second routing device for routing, on the basis of the test results, the identified clusters of viscera to the inspection station if the clusters of viscera are conditionally or unconditionally approved.

35. A device for processing carcasses and clusters of viscera of slaughtered animals, in a slaughter line of a slaughter house, the device comprising:
- a first conveyor with carriers, each for the purpose of carrying one of the carcasses, an identification being assigned to each carrier or associated carcass;
- a second conveyor with carriers, each for the purpose of carrying one of the clusters of viscera, an identification being assigned to each carrier or associated cluster of viscera;
- at least one observation device disposed along the slaughter line for the purpose of performing one or more observations on each carcass and cluster of viscera, respectively;
- an identification reading system, which interacts with the at least one observation device, for reading out the identification belonging to the observed carcasses and clusters of viscera, respectively, or the associated carriers;
- a data-processing system for processing data obtained by means of the at least one observation device and relating to at least one observation on each carcass and cluster of viscera, respectively, in order to determine a test result for the carcass and cluster of viscera, respectively, which test result comprises a conditional or unconditional approval or a rejection, and for storing the test result in conjuction with the identification read out by means of the identification reading system;
- a first routing device for routing, on the basis of the test results, the identified clusters of viscera to an inspection station with a veterinary inspector, if the clusters of viscera are conditionally approved, and by-passing the inspection station if the clusters of viscera are unconditionally approved or rejected; and
- a second routing device for routing, on the basis of the test results, the identified carcasses to the inspection station if the carcasses are conditionally or unconditionally approved.

36. The device of claim 19, 20, 21, 23, 31, 34 or 35, wherein the data-processing system comprises a neural network.

37. A method for processing a slaughtering object, such as a slaughtered animal or part thereof, which, in a conveyor with a carrier for the slaughtering object, is passed along a slaughter line of a slaughterhouse, the method comprising the following steps:
- assigning an identification to the carrier or the associated slaughtering object;
- performing one or more observations on the slaughtering object wherein at least one observation is performed at the start of the slaughter line to determine the occurrence of animals being dead-on-arrival;
- determining a test result for the slaughtering object, which test result comprises an approval or rejection, based on the observation data;
- storing the test result in conjunction with the corresponding identification; and
- on the basis of the stored test result, removing the identified slaughtering object from an automatic discharging device, which is disposed in the slaughter line and has at least a first discharge for removing the slaughtering object, if the said object has been approved, and a second discharge for removing the slaughtering object, if the said object has been rejected.

38. A method for processing a slaughtering object, such as a slaughtered animal or part thereof, which, in a conveyor with a carrier for the slaughtering object, is passed along a slaughter line of a slaughterhouse, the method comprising the following steps:
- assigning an identification to the carrier or the associated slaughtering object;
- performing one or more observations on the slaughtering object including a visual inspection in the slaughter line of at least a portion of the body of the slaughtered animal to determine the presence of at least one deviation;
- determining a test result for the slaughtering object, which test result comprises an approval or rejection, based on the observation data;
- storing the test result in conjunction with the corresponding identification; and
- on the basis of the stored test result, removing the identified slaughtering object from an automatic discharging device, which is disposed in the slaughter line and has at least a first discharge for removing the slaughtering object, if the said object has been approved, and a second discharge for removing the slaughtering object, if the said object has been rejected.

39. The method of claim 38, wherein the observation consists in taking one or more blood or tissue samples from the slaughtering object and examining the samples.

40. The method of claim 38, wherein the visual inspection is carried out by at least one video camera.

41. A method for processing a slaughtering object, such as a slaughtered animal or part thereof, which, in a conveyor with a carrier for the slaughtering object, is passed along a slaughter line of a slaughterhouse, the method comprising the following steps:
- assigning an identification to the carrier or the associated slaughtering object;
- performing one or more observations on the slaughtering object including a visual inspection in the slaughtering line of at least a portion of the viscera after the viscera have been removed from the body of the slaughtered animal to determine any deviations;
- determining a test result for the slaughtering object, which test result comprises an approval or rejection, based on the observation data;
- storing the test result in conjunction with the corresponding identification; and
- on the basis of the stored test result, removing the identified slaughtering object from an automatic discharging device, which is disposed in the slaughter line and has at least a first discharge for removing the slaughtering object, if the said object has been approved, and a second discharge for removing the slaughtering object, if the said object has been rejected.

* * * * *